United States Patent Office 3,109,013
Patented Oct. 29, 1963

3,109,013
ACYLOXYSILCARBOSILOXANES
AND THEIR USES
Loren A. Haluska, Midland, Mich., assignor to Dow
Corning Corporation, Midland, Mich., a corporation
of Michigan
No Drawing. Filed Dec. 27, 1960, Ser. No. 78,325
7 Claims. (Cl. 260—448.2)

This invention relates to linear polysiloxanes endblocked with acyloxylated silcarbane groups. These polyfunctional polymers are capable of vulcanizing at room temperature to rubbery materials.

Elastomeric siloxane compositions which are capable of vulcanizing at room temperature have achieved considerable commercial success. Heretofore these compositions have always been sold commercially in at least a two-package system. In other words, at least one component had to be added to the system just prior to use. Consequently, the end-user had to go to the time and expense of mixing the ingredients. Furthermore, the materials had to be used within times ranging from a few minutes to a few hours subsequent to mixing. This was because there was no way of preventing vulcanization of the composition once the catalyst and the active ingredient, such as SiH compounds or alkoxy silicates, had been brought together.

There are many applications where the two-package system is perfectly adequate. This is particularly true in commercial establishments where rigid control is exercised over the process methods and where adequate measuring equipment is available for the workmen. However, there are other applications where the two-package system is not desirable because of the lack of skill of the workmen or because of equipment which is inadequate to carry out the mixing instructions with the necessary care. Also, it is always inconvenient to carry out a mixing operation. Furthermore, the two-package system has the inherent danger of loss of material. This can occur when the active ingredients have been mixed and it becomes impossible to use the elastomer prior to the time that it vulcanizes. Under such conditions the entire batch may be lost. For the above reasons there was a long felt need in the silicone industry for a onepackage room-temperature vulcanizing elastomer.

This need was met by the introduction to industry of linear polysiloxanes containing two functional acyloxy radicals on each end of each polymer. These polysiloxanes were the foundation of filled compositions which vulcanized to elastomeric materials when exposed to the atmosphere at room temperature and were therefore valuable for caulking and sealing applications and for coatings for various kinds of surfaces. These tetrafunctional linear polysiloxanes were prepared by reacting in the substantial absence of moisture a hydroxyl-endblocked linear polysiloxane with monoorganotriacyloxysilanes splitting out the corresponding carboxylic acid.

While these single component room temperature vulcanizing compositions have met with commercial success, it has been difficult to adapt them to some circumstances where extended working time is necessary or desirable. Furthermore, since these compositions are made with polymers containing silicon-bonded hydroxyl groups, some cocondensation of hydroxyls takes place, first, increasing the average polymeric size and therefore the viscosity of the system and, second, producing water which in turn hydrolyzes more acyloxyl groups producing more silicon-bonded hydroxyl groups which in turn can react with acyloxyl groups causing some immediate cross-linking.

One of the objects of this invention is to provide a new type of compound which cures to an elastomer at room temperature in the presence of moisture. Another object is to provide such compounds which can be prepared in the substantial absence of silicon-bonded hydroxyl groups. Another object is to provide such compounds which can be made to vary in working time without reducing the cross-linking ability of the polymers employed. Another object is to provide such compounds which can be stored for long periods of time prior to use. Another object is to provide improved calking and coating compositions. These objects as well as other objects and advantages which are apparent from the following description are satisfied by this invention.

This invention relates to compounds of the general formula

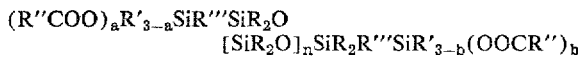

$(R''COO)_aR'_{3-a}SiR'''SiR_2O[SiR_2O]_nSiR_2R'''SiR'_{3-b}(OOCR'')_b$ in which R and R' can be monovalent hydrocarbon radicals free of aliphatic unsaturation, halogenated monovalent hydrocarbon radicals free of aliphatic unsaturation or cyanoalkyl radicals, each R'' is selected from the group consisting of the hydrogen atom and alkyl radicals, each R''' is a divalent hydrocarbon radical free of aliphatic unsaturation, at least one valence bond of which is attached to a silicon atom through an alkylene carbon atom connected to at least one other alkylene carbon atom, $a$ and $b$ are each positive integers ranging in value from 1 to 3, preferably at least 2, the sum of $a$ and $b$ is at least 3 and $n$ is a positive integer. In these compounds each R, each R' and each R'' can be different from every other R, R' and R'' or they can all be the same type of monovalent radical. Similarly the R''' radicals can be different or the same.

More specifically, R and R' can each be, for example, any alkyl radical such as the methyl, ethyl, isopropyl, tert-butyl, 2-ethylhexyl, dodecyl, octadecyl and myricyl radicals; any cycloalkyl radical such as the cyclopentyl and cyclohexyl radicals; any aryl radical such as the phenyl, naphthyl and xenyl radicals; any aralkyl radical such as the benzene, phenylethyl and xylyl radicals and any alkaryl radical such as the tolyl and dimethylphenyl radicals. The monovalent hydrocarbon radicals can be halogenated to give such radicals as for example, the chloromethyl, 3,3,3-trifluoropropyl, 3,3,4,4,4-pentafluorobutyl, 3,3,4,4,5,5,5-heptafluoropentyl, 3,4 - dibromocyclohexyl, $\alpha,\beta,\beta$-trifluoro-$\alpha$-chlorocyclobutyl, chlorophenyl, bromphenyl, perchlorophenyl, iodoxenyl, $\alpha,\alpha,\alpha$-trifluorotolyl and 2,4-dibromobenzyl radicals, all of which are operative.

In addition either R or R' or both can be any cyanoalkyl radical such as, for example, the beta-cyanoethyl, gamma-cyanopropyl, omega-cyanobutyl, beta-cyanopropyl, gamma-cyanobutyl and omega-cyanooctadecyl radicals. When the compounds of this invention contain cyanoalkyl radicals it is preferred that such radicals be attached to at least one mol percent of the silicon atoms.

In the functional groups R″COO— in the compounds of this invention R″ can be a hydrogen atom or any alkyl radical such as those shown above. Thus the R″COO— groups can be any saturated monoacyloxyl radical of a carboxylic acid such as, for example, the formoxyl, acetoxyl, priopionoxyl, valeroxyl, caproxyl, myristoxyl and stearoxyl radicals.

The R‴ radicals can be any divalent hydrocarbon radical at least one valence bond of which extends from an alkylene carbon atom which is attached to another alkylene carbon atom. Examples of such radicals include —CH$_2$CH$_2$—, —CH$_2$CH$_2$CH$_2$—, —CHMeCH$_2$—,
—CHMeCH$_2$CH$_2$—, —CHEtCH$_2$—, —CH$_2$CHMeCH$_2$—, $$-\overset{|}{\text{C}}\text{HCH}_2\overset{|}{\text{C}}\text{H}-\quad\overset{\text{CH}_2\text{CH}_2\text{CH}_2}{}$$

—CHMe(CH$_2$)$_4$—, —CHEtCH$_2$CHMe—,

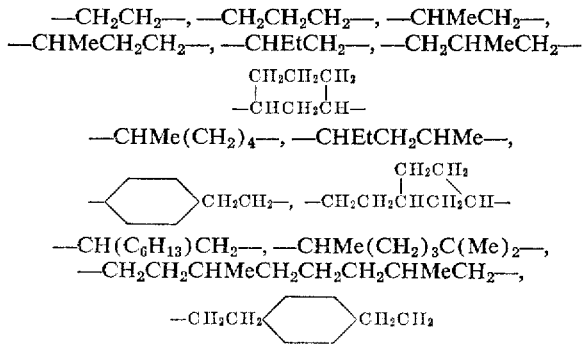

—CH(C$_6$H$_{13}$)CH$_2$—, —CHMe(CH$_2$)$_3$C(Me)$_2$—,
—CH$_2$CH$_2$CHMeCH$_2$CH$_2$CH$_2$CHMeCH$_2$—, and —(CH$_2$)$_9$CH(C$_8$H$_{17}$)— in which the symbols Me and Et represent the methyl and ethyl radicals respectively.

For the purpose of this invention the polymer size of the compounds can vary from thin fluids where *n* has a value of 1 to non-flowing gums where *n* has a value of 10,000 or more. Mixtures of compounds having different values for *n* can be employed if desired.

There can be from three to six funtcional R″COO— groups per molecule. In other words the compounds of this invention can conform, for example, to the following configurations:

(1) (R″COO)$_3$SiR‴SiR$_2$O[SiR$_2$O]$_n$SiR$_2$R‴Si(OOCR″)$_3$ (2) (R″COO)$_3$SiR‴SiR$_2$O[SiR$_2$O]$_n$
SiR$_2$R‴SiR′(OOCR″)$_2$ (3) (R″COO)$_2$R′SiR‴SiR$_2$O[SiR$_2$O]$_n$
SiR$_2$R‴SiR′(OOCR″)$_2$ (4) (R″COO)$_3$SiR‴SiR$_2$O[SiR$_2$O]$_n$
SiR$_2$R‴SiR′$_2$(OOCR″)

(5) 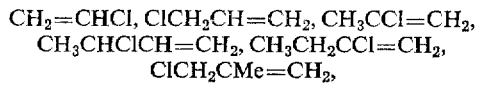

The first configuration is the most reactive and the fifth configuration the least reactive. Preferably there are at least four functional R″COO— groups per molecule.

The compounds of this invention are best prepared by reacting silanes of the general formulae (R″COO)$_3$SiH or (R″COO)$_2$R′SiH with organosilicon compounds of the general formula A[SiR$_2$O]$_{n-1}$SiR$_2$A, where A represents a monovalent hydrocarbon radical containing one aliphatic double bond and *n* is a positive integer, through the addition of ≡SiH to ≡SiA to give ≡SiR‴Si≡ linkages. Alternatively, silanes of the formulae (R″COO)$_3$SiA or (R″COO)$_2$R′SiA can be reacted with organosilicon compounds of the genaral formula H[SiR$_2$O]$_{n-1}$SiR$_2$H. This reaction is now well known in the art. It is preferable to employ an excess of the acyloxylated silane reactant to insure complete reaction of the endblocking functions in the non-acyloxylated reactant.

The reactants are also well-known. The unsaturated organosilicon compounds are best prepared by a classical Grignard reaction with a suitable chlorosilane R$_m$SiCl$_{4-m}$ in which R is as defined above and *m* ranges in value from 0 to 4 and a suitable unsaturated hydrocarbon halide such as, for example CH$_2$=CHCl, ClCH$_2$CH=CH$_2$, CH$_3$CCl=CH$_2$,
CH$_3$CHClCH=CH$_2$, CH$_3$CH$_2$CCl=CH$_2$,
ClCH$_2$CMe=CH$_2$, CH$_2$CH$_2$CH$_2$CHClCH=CH
CH$_3$CHClCH$_2$CH$_2$CH=CH$_2$,
CH$_3$CH$_2$CHClCH=CHCH$_3$,

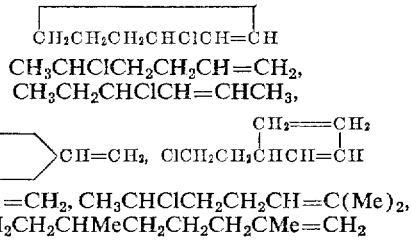

C$_6$H$_{13}$CCl=CH$_2$, CH$_3$CHClCH$_2$CH$_2$CH=C(Me)$_2$,
ClCH$_2$CH$_2$CHMeCH$_2$CH$_2$CH$_2$CMe=CH$_2$ and BrCH$_2$(CH$_2$)$_7$CH=CH(CH$_2$)$_7$CH$_3$. The compounds can also be prepared by the reaction of a silane of the formula R$_c$HSiCl$_{3-c}$ in which R is as defined above and *c* ranges in value from 0 to 3 with a hydrocarbon containing two aliphatic double bonds such as, for example,

in the presence of a platinum catalyst. The resulting chlorosilanes can be acyloxylated by reacting them with the desired carboxylic acid, acid anhydride or alkali metal salt thereof. Where an endblocked siloxane is desired, the silane ASiR$_2$Cl can be cohydrolyzed with other chlorosilanes or reacted with hydroxyl-endblocked siloxanes following classical procedures prior to acyloxylation.

If desired, the ≡SiH to ≡SiA reaction can be carried out in the presence of an inert solvent. Suitable solvents include hydrocarbons such as benzene, toluene, xylene or petroleum ethers; halogenated solvents such as perchloroethylene or chlorobenzene; organic ethers such as diethylether and dibutylether; ketones such as methylisobutylketone and fluid siloxanes free of silicon-bonded hydroxyl groups, silicon-bonded hydrogen atoms and silicon-bonded organic radicals containing aliphatic unsaturation. The presence of solvents is particularly desirable when the siloxane is in the form of a high molecular weight gum. In these cases, the presence of the solvent reduces the overall viscosity of the mixture and facilitates the reaction. If desired the composition may be kept in the solvent until it is to be used. This is particularly valuable when a gummy product is to be employed in coating applications.

The compositions of this invention are stable in the absence of moisture. Consequently, they can be stored for prolonged periods of time without any deleterious effect. During this period of storage little or no change occurs in the physical properties of the compositions. This is of particular importance from a commercial standpoint since it assures that once a composition is prepared with a certain consistency and cure time that neither will change appreciably upon storage. This stability on storage is a characteristic which makes the compositions of this invention useful as one-component room-temperature vulcanizing compositions.

The compositions of this invention can be vulcanized by merely exposing them to moisture. These compositions can be vulcanized by exposing them to the atmosphere with or without any additional water vapor. Upon exposure to moisture the compositions vulcanize at times varying from several hours to several days depending upon the type of acyloxy group and the presence and type of R′ groups. In general, the presence of R′ groups and an increase in the molecular weight of either the acyloxyl or R′ group will increase the time of cure.

It should be understood that the instant compositions can be cured at elevated temperatures if desired. The rate of cure increases with increasing temperature. Other additives can be incorporated to enhance vulcanization such as metal carboxylates, e.g. dibutyltin dilaurate or dibutyltin diacetate, or certain metal oxides, e.g. MgO.

The compositions of this invention may be used per se in calking and coating applications in which case they vulcanize to rubbery elastomeric materials upon exposure to moisture. However, it is often desirable to modify the compositions of this invention by mixing therewith other types of siloxanes and/or fillers. For example, it may be desirable to increase the adhesive qualities of the compositions of this invention by incorporating resinous siloxanes. These resinous siloxanes will also modify the elastic properties of the vulcanized compositions to make them more dough-like and less resilient. Such properties are highly desirable in certain calking applications. It also may be desirable to plasticize the vulcanized compositions of this invention by incorporating therein certain unreactive siloxane plasticizing agents such as trimethylsiloxy-endblocked dimethylsiloxanes.

The compositions of this invention can also be modified by incorporating therein any of the well-known reinforcing fillers such as fume silicas, silica aerogels, and precipitated silicas of high surface area. These fillers, if desired, can have organosilyl groups attached to the surface thereof. The fillers employed herein can also be non-reinforcing fillers such as coarse silicas, e.g. diatomaceous earth or crushed quartz; powdered metals, e.g. aluminum or nickel, or metallic oxides, e.g. titania, ferric oxide, zinc oxide, and the like. If desired, fibrous fillers such as asbestos or glass may also be employed. In short, any of the fillers commonly employed with silicone rubbers may be employed in the compositions of this invention. In all cases it is desirable that the filler be substantially dry before admixing with the composition although some water can be tolerated if an excess of the acyloxy silane is employed.

The fillers are usually employed to increase the strength of the elastomeric compositions and also to modify the flow characteristics of the uncured composition. The latter is particularly important in calking applications where it is undesirable to have any appreciable flow take place between the time the material is placed in the joint and the time curing occurs.

In addition to the above ingredients the compositions of this invention may contain any other desirable additive such as pigments, sun-screen agents, oxidation inhibitors and dielectric materials such as graphite and carbon black.

The compositions of this invention adhere tenaciously to a wide variety of material such as glass, porcelain, wood, metals and organic plastics. For this reason they are particularly adaptable for practically any type of calking application. The compositions of this invention are particularly adaptable for calking applications on buildings, airplanes, automotive equipment and the like.

are not intended to limit this invention the scope of which is properly delineated in the appended claims. In these examples the symbols Me, Ph and Vi represent the methyl, phenyl, and vinyl radicals respectively. All viscosities were measured at 25° C.

*Example 1*

A mixture of 150 grams of a 10,000 cs. fluid of the formula $ViMe_2SiO(SiMe_2O)_nSiMe_2Vi$ (having an average value for $n$ of about 520), 3.1 grams of $HSi(OOCMe)_3$ and .0025 gram of platinum added as a 2.5 percent by weight solution of $H_2PtCl_6$ in dimethylphthalate was heated at 107 to 120° C. over a period of 7 hours. The excess triacetoxysilane was stripped off at 105 to 106° C. at 4.2 to 3.2 mm. Hg over a period of one hour. The product was $(MeCOO)_3SiCH_2CH_2SiMe_2O(SiMe_2O)_n$
$SiMe_2CH_2CH_2Si(OOCMe)_3$ in which $n$ had an average value of about 520. This product vulcanized in air at room temperature to an elastomeric material.

When this product is used to calk joints between glass and porcelain, glass and aluminum, porcelain and stone and two stone surfaces, it securely bonds to these materials as it vulcanizes. The same is true when reinforcing and non-reinforcing silica fillers are each mixed with the product in amount equal to 40 percent by weight of the product.

*Example 2*

A mixture of 500 grams of a 10,000 cs. fluid of the formula $ViMe_2SiO(SiMe_2O)_nSiMe_2Vi$ (having an average value of $n$ of about 520), 7.2 grams of $MeHSi(OOCMe)_2$ and 0.005 grams of platinum added as a 2.5 percent by weight solution of $H_2PtCl_6$ in dimethylphthalate was heated at 100 to 118° C. for 90 minutes. The product was $(MeCOO)_2MeSiCH_2CH_2SiMe_2O(SiMe_2O)_n$
$SiMe_2CH_2CH_2SiMe(OOCMe)_2$ and vulcanized in air at room temperature to an elastomeric material.

*Example 3*

When the following vinyl-endblocked diorganopolysiloxanes are substituted mol per mol for the vinyl-endblocked dimethylpolysiloxane in Example 1, the following products are obtained.

| Siloxane | Product |
|---|---|
| ViSiPhMeO[SiPhMeO]₃SiPhMeVi | (MeCOO)₃SiCH₂CH₂SiPhMeO(SiPhMeO)₃SiPhMeCH₂CH₂Si(OOCMe)₃ |
| ViSiMe(CH₂CH₂CF₃)O[SiMe(CH₂CH₂CF₃)O]₁₀SiMe(CH₂CH₂CF₃)Vi | (MeCOO)₃SiCH₂CH₂SiMe(CH₂CH₂CF₃)O[SiMe(CH₂CH₂CF₃)O]₁₀ SiMe(CH₂CH₂CF₃)CH₂CH₂Si(OOCMe)₃ |
| ViMe₂SiO(SiMe₂O)₁₆₀SiMe₂Vi | (MeCOO)₃SiCH₂CH₂SiMe₂O(SiMe₂O)₁₆₀SiMe₂CH₂CH₂Si(OOCMe)₃ |
| ViMe(C₁₈H₃₇)SiO[SiMe(C₁₈H₃₇)O]₂₀SiMeVi(C₁₈H₃₇) | (MeCOO)₃SiCH₂CH₂SiMe(C₁₈H₃₇)O[SiMe(C₁₈H₃₇)O]₂₀SiMe(C₁₈H₃₇) CH₂CH₂Si(OOCMe)₃ |
| 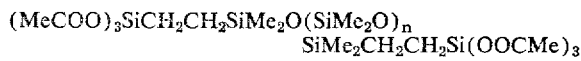 | 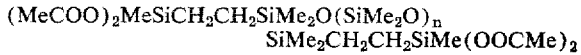 |
| ViMe(C₆H₁₁)SiO[SiMe(C₆H₁₁)O]₁₀₀SiMeVi(C₆H₁₁) | (MeCOO)₃SiCH₂CH₂SiMe(C₆H₁₁)O[SiMe(C₆H₁₁)O]₁₀₀SiMe(C₆H₁₁) CH₂CH₂Si(OOCMe)₃ |
| ViMePhSiO[(SiPh₂O)(SiMe₂O)₅]₂₀₀SiMePhVi | (MeCOO)₃SiCH₂CH₂SiMePhO[(SiPh₂O)(SiMe₂O)₅]₂₀₀SiMePhCH₂CH₂ Si(OOCMe)₃ |
| ViMe(NCCH₂CH₂CH₂)SiO[SiMe(CH₂CH₂CH₂CN)O]₁₀₀SiMeVi (CH₂CH₂CH₂CN) | (MeCOO)₃SiCH₂CH₂SiMe(CH₂CH₂CH₂CN)O[SiMe(CH₂CH₂CH₂CN) O]₁₀₀SiMe(CH₂CH₂CH₂CN)CH₂CH₂Si(OOCMe)₃ |

Because the compositions of this invention combine the properties of a low temperature cure and good weather-ability they are particularly adaptable for protective coatings on wood and other heat sensitive materials. Consequently, they extend the range of usefulness of organosiloxane coatings into areas which have not heretobefore been open to such materials.

The following examples are merely illustrative and

Each of these products is stable when stored in moisture-free moisture-proof packages and vulcanizes upon exposure to the atmosphere.

*Example 4*

When the following acetoxy-substituted silanes are substituted mol per mol for the triacetoxysilane in Example 1, the following products are obtained.

| Silane | Product |
|---|---|
| PhSiH(OOCMe)₂ | (MeCOO)₂PhSiCH₂CH₂SiMe₂O(SiMe₂O)₅₂₀SiMe₂CH₂CH₂SiPh(OOCMe)₂ |
| C₁₈H₃₇SiH(OOCMe)₂ | (MeCOO)₂(C₁₈H₃₇)SiCH₂CH₂SiMe₂O(SiMe₂O)₅₂₀SiMe₂CH₂CH₂Si(C₁₈H₃₇)(OOCMe)₂ |
| CF₃CH₂CH₂SiH(OOCMe)₂ | (MeCOO)₂(CF₃CH₂CH₂)SiCH₂CH₂SiMe₂O(SiMe₂O)₅₂₀SiMe₂CH₂CH₂Si(CH₂CH₂CF₃)(OOCMe)₂ |
| Cl–⬡–SiH(OOCMe)₂ 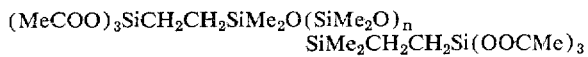 | (MeCOO)₂(Cl–⬡–)SiCH₂CH₂SiMe₂O(SiMe₂O)₅₂₀SiMe₂CH₂CH₂Si(–⬡–Cl)(OOCMe)₂ 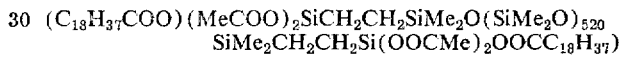 |
| CF₃–⬡–SiH(OOCMe)₂ 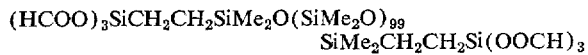 | (MeCOO)₂(CF₃–⬡–)SiCH₂CH₂SiMe₂O(SiMe₂O)₅₂₀SiMe₂CH₂CH₂Si(–⬡–CF₃)(OOCMe)₂ 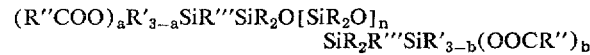 |
| NCCH₂CH₂CH₂SiH(OOCMe)₂ | (MeCOO)₂(NCCH₂CH₂CH₂)SiCH₂CH₂SiMe₂O(SiMe₂O)₅₂₀SiMe₂CH₂CH₂Si(CH₂CH₂CH₂CN)(OOCMe)₂ |
| C₆H₁₁SiH(OOCMe)₂ | (MeCOO)₂(C₆H₁₁)SiCH₂CH₂SiMe₂O(SiMe₂O)₅₂₀SiMe₂CH₂CH₂Si(C₆H₁₁)(OOCMe)₂ |

Each of these products is stable in the absence of moisture and vulcanizes upon exposure to the atmosphere as coatings on glass, paper and wood surfaces.

Example 5

When 100 grams of a vinyl-endblocked dimethylpolysiloxane gum containing an average of 3380 dimethylsiloxane units per molecule, 33.5 grams of a reinforcing silica filler having trimethylsilyl groups attached to the surface thereof, 10 grams of triacetoxysilane, 0.005 gram of platinum added as a 2.5 percent by weight solution of $H_2PtCl_6$ in dimethylphthalate and 300 grams of xylene solvent are mixed and heated at about 110° C. for about seven hours, the final mixture contains principally (MeCOO)₃SiCH₂CH₂SiMe₂O(SiMe₂O)ₙSiMe₂CH₂CH₂Si(OOCMe)₃ in which n had an average value of 3378. When this final mixture which is stable in the absence of moisture is exposed to the atmosphere, it vulcanizes to an elastomeric material.

Example 6

When 300 grams of sodium formate and 160 grams of vinyltrichlorosilane are refluxed in diethylether for 16 hours, the principal distillable product is ViSi(OOCH)₃. When 74.6 grams of HSiMe₂O(SiMe₂O)₉₉SiMe₂H are mixed with 5 grams of ViSi(OOCH)₃ and 0.0025 gram of platinum added as a 2.5 percent by weight solution of $H_2PtCl_6$ in dimethylphthalate, the mixture is heated at about 110° C. for about 2 hours and stripped to 110° C. at 4 mm., the resulting product is (HCOO)₃SiCH₂CH₂SiMe₂O(SiMe₂O)₉₉SiMe₂CH₂CH₂Si(OOCH)₃ which is stable in the absence of moisture but vulcanizes to an elastomeric material when exposed to the atmosphere.

Example 7

When the following silanes are substituted mol per mol for the ViSi(OOCH)₃ in Example 6, the following products result:

Each of these products is stable when stored in moisture-free moisture-proof packages and vulcanizes upon exposure to the atmosphere.

Example 8

When HSi(OOCC₇H₁₅)₃ and

HSi(OOCMe)₂(OOCC₁₈H₃₇)

are each substituted mol per mol for the triacetoxysilane in Example 1, the resulting products are respectively (C₇H₁₅COO)₃SiCH₂CH₂SiMe₂O(SiMe₂O)₅₂₀SiMe₂CH₂CH₂Si(OOCMe)₃ and (C₁₈H₃₇COO)(MeCOO)₂SiCH₂CH₂SiMe₂O(SiMe₂O)₅₂₀SiMe₂CH₂CH₂Si(OOCMe)₂OOCC₁₈H₃₇)

Example 9

When 100 grams of the product from Example 1 is mixed with 60 grams of a siloxane resin composed of Me₃SiO₀.₅ and SiO₂ units in such proportions that the methyl-to-silicon ratio is about 1.15, 100 grams of crushed quartz, 5 grams of powdered asbestos and 10 grams of TiO₂, the resulting mixture is soft, pliable and extrudable after several months storage in a moisture-free moisture-proof package but vulcanizes at room-temperature when exposed to the atmosphere as a sealant in the joints of concrete block walls and in the porcelain-aluminum joint around a kitchen sink.

That which is claimed is:

1. A compound of the formula (R″COO)ₐR′₃₋ₐSiR‴SiR₂O[SiR₂O]ₙSiR₂R‴SiR′₃₋ᵦ(OOCR″)ᵦ in which each R and R′ is selected independently from the group consisting of monovalent hydrocarbon radicals free of aliphatic unsaturation, halogenated monovalent hydrocarbon radicals free of aliphatic unsaturation and cyanoalkyl radicals, each R″ is selected from the group consisting of the hydrogen tom and alkyl radicals, each R‴ is a divalent hydrocarbon radical free of aliphatic unsaturation, at least one valence bond of which is at-

| Silane | Product |
|---|---|
| (MeCOO)₃SiCH₂CH=CH₂ | (MeCOO)₃Si(CH₂)₃SiMe₂O(SiMe₂O)₉₉SiMe₂(CH₂)₃Si(OOCMe)₃ |
| (MeCOO)₃Si–⬡–CH=CH₂ | (MeCOO)₃Si–⬡–CH₂CH₂SiMe₂O(SiMe₂O)₉₉SiMe₂CH₂CH₂–⬡–Si(OOCMe)₃ |
| (MeCOO)₃SiCH₂CH₂–⬡–CH=CH₂ | (MeCOO)₃SiCH₂CH₂–⬡–CH₂CH₂SiMe₂O(SiMe₂O)₉₉SiMe₂CH₂CH₂–⬡–CH₂CH₂Si(OOCMe)₃ |
| (MeCOO)₃SiCH₂CH₂CHMe(CH₂)₃CMe=CH₂ | (MeCOO)₃SiCH₂CH₂CHMe(CH₂)₃CHMeCH₂SiMe₂O(SiMe₂O)₉₉SiMe₂CH₂CHMe(CH₂)₃CHMeCH₂CH₂Si(OOCMe)₃ |
| (MeCOO)₃Si–CHCH=CH with CH₂CH₂CH₃ branch | (MeCOO)₃SiCHCH₂CHSiMe₂O(SiMe₂O)₉₉SiMe₂CHCH₂CHSi(OOCMe)₃ with CH₂CH₂CH₃ branches |
| (MeCOO)₃SiCH₂CMe=CH₂ | (MeCOO)₃SiCH₂CHMeCH₂SiMe₂O(SiMe₂O)₉₉SiMe₂CH₂CHMeCH₂Si(MeCOO)₃ | tached to a silicon atom through an alkylene carbon atom connected to at least one other alkylene carbon atom, $a$ and $b$ are each positive integers ranging in value from 1 to 3, the sum of $a$ and $b$ is at least 3 and $n$ is a positive integer.

2. A composition of matter capable of curing to an elastomer at room temperature in the presence of moisture comprising a mixture of (1) a compound of the formula

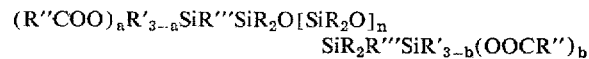

in which each R and R' is selected independently from the group consisting of monovalent hydrocarbon radicals free of aliphatic unsaturation, halogenated monovalent hydrocarbon radicals free of aliphatic unsaturation and cyanoalkyl radicals, each R" is selected from the group consisting of the hydrogen atom and alkyl radicals, each R''' is a divalent hydrocarbon radical free of aliphatic unsaturation, at least one valence bond of which is attached to a silicon atom through an alkylene carbon atom connected to at least one other alkylene carbon atom, $a$ and $b$ are each positive integers ranging in value from 1 to 3, the sum of $a$ and $b$ is at least 3 and $n$ is a positive integer and (2) a filler.

3. A compound of the formula

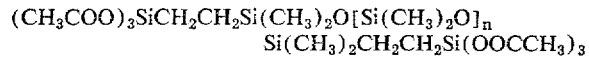

in which $n$ is a positive integer.

4. A composition of matter capable of curing to an elastomer at room temperature in the presence of moisture comprising a mixture of (1) a compound of the formula

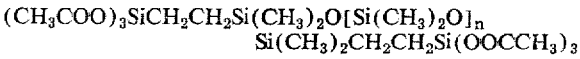

in which $n$ is a positive integer and (2) a filler.

5. The composition of claim 1 in which each R' and R" is a methyl radical, some of the R groups are phenyl radicals and the remainder of the R groups are methyl radicals.

6. The composition of claim 2 in which each R' and R" is a methyl radical, some of the R groups are phenyl radicals and the remainder of the R groups are methyl radicals.

7. A compound of the formula

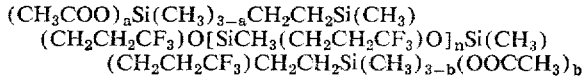

in which $a$ and $b$ are each positive integers ranging in value from 1 to 3, the sum of $a$ and $b$ is at least 3 and $n$ is a positive integer.

References Cited in the file of this patent

UNITED STATES PATENTS

| 2,823,218 | Speier et al. | Feb. 11, 1958 |

FOREIGN PATENTS

| 1,188,495 | France | Mar. 16, 1959 |
| 1,198,749 | France | June 15, 1959 |
| 1,220,348 | France | Jan. 4, 1960 |
| 771,587 | Great Britain | Apr. 3, 1957 |

UNITED STATES PATENT OFFICE
CERTIFICATE OF CORRECTION

Patent No. 3,109,013                          October 29, 1963

Loren A. Haluska

It is hereby certified that error appears in the above numbered patent requiring correction and that the said Letters Patent should read as corrected below.

Column 2, line 48, for "benzene" read -- benzyl --; columns 5 and 6, in the table, under the heading "Product", for that portion of the formula reading:

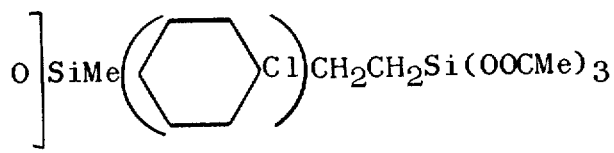

read

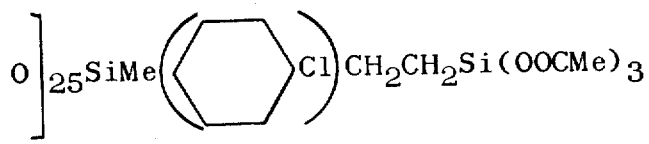

columns 7 and 8, in the table at the bottom of the page, under the heading "Silane", the first formula should appear as shown below instead of as in the patent:

column 8, line 31, for "$SiMe_2CH_2CH_2Si(OOCMe)_2OOCC_{18}H_{37})$" read -- $SiMe_2CH_2CH_2Si(OOCMe)_2(OOCC_{18}H_{37})$ --; line 55, for "tom" read -- atom --; column 10, line 17, for that portion of the formula reading "$(CH_2CH_2CF_3)O[SiCH_3(CH_2CH_2CF_3)O]_nSi(CH_3)$" read -- $(CH_2CH_2CF_3)O[Si(CH_3)(CH_2CH_2CF_3)O]_nSi(CH_3)$ --.

Signed and sealed this 22nd day of December 1964.

(SEAL)
Attest:

ERNEST W. SWIDER                         EDWARD J. BRENNER
Attesting Officer                        Commissioner of Patents